Figure 1:
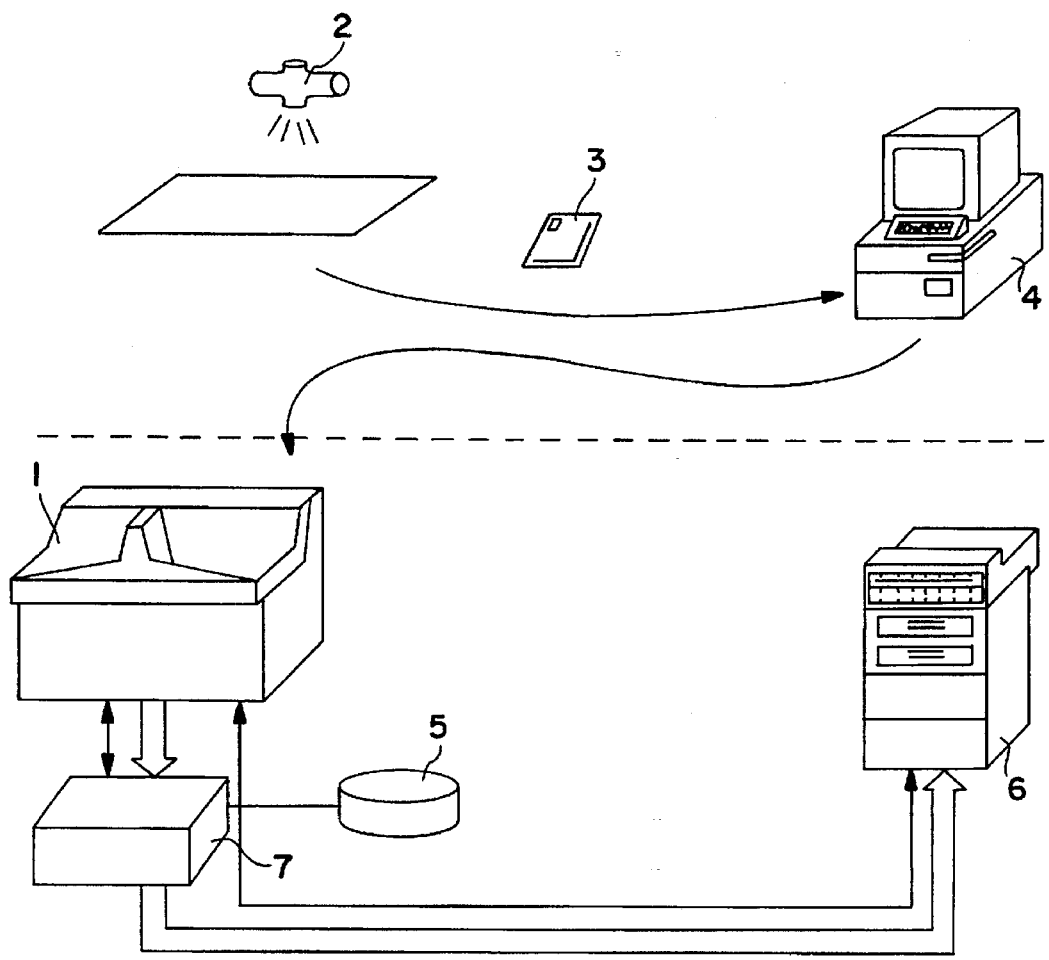

United States Patent [19]

Vuylsteke

[11] Patent Number: 5,644,662
[45] Date of Patent: Jul. 1, 1997

[54] MULTIPLE PROCESSING OF RADIOGRAPHIC IMAGES BASED ON A PYRAMIDAL IMAGE DECOMPOSITION

[75] Inventor: Pieter Paul Vuylsteke, Mortsel, Belgium

[73] Assignee: AGFA-Gevaert, Mortsel, Belgium

[21] Appl. No.: 412,355

[22] Filed: Mar. 28, 1995

Related U.S. Application Data

[63] Continuation of Ser. No. 84,530, Jun. 28, 1993, abandoned.

[30]  Foreign Application Priority Data

Feb. 11, 1993 [EP] European Pat. Off. ............. 93200375

[51] Int. Cl.$^6$ ................................................. G06K 9/00
[52] U.S. Cl. ........................................ 382/302; 382/132
[58] Field of Search .................................. 382/302, 128, 382/132, 240, 260, 266, 168, 169

[56]  References Cited

U.S. PATENT DOCUMENTS

| | | |
|---|---|---|
| 4,709,394 | 11/1987 | Bessler et al. ............. 382/49 |
| 4,718,104 | 1/1988 | Anderson ................... 382/43 |
| 4,969,204 | 11/1990 | Melnychuck et al. ....... 382/56 |
| 5,048,111 | 9/1991 | Jones et al. ................ 382/49 |
| 5,086,488 | 2/1992 | Kato et al. ................. 382/56 |
| 5,119,195 | 6/1992 | Christopher ............... 358/167 |
| 5,163,103 | 11/1992 | Uetani ...................... 382/56 |
| 5,229,618 | 7/1993 | Nakajima ................... 250/559 |
| 5,434,931 | 7/1995 | Quardt et al. .............. 382/271 |

*Primary Examiner*—Yon J. Couso
*Attorney, Agent, or Firm*—Richard J. Birch

[57] ABSTRACT

Multiple processing of radiographic images based on a pyramidal image decomposition.

A method of multiple processing a digital representation of a radiographic image is disclosed that is based on a pyarmidal decomposition of said image. A pyramidal decomposition is stored and retrieved to be applied to at least two different processing cycles, processed images are obtained by application of a reconstruction algorithm.

16 Claims, 10 Drawing Sheets

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

FIG. 5

POWER FUNCTION p=0.7

MULTIPLE PROCESSING OF RADIOGRAPHIC IMAGES BASED ON A PYRAMIDAL IMAGE DECOMPOSITION

This is a continuation of application Ser. No. 08/084,530 filed on Jun. 28, 1993 now abandoned.

DESCRIPTION

FIELD OF THE INVENTION

The present invention relates to a method and apparatus for producing multiple differently processed digital images.

More in particular the invention relates to such a method for use in a medical radiographic imaging system, such as a computed radiography system or a computed tomography system.

BACKGROUND OF THE INVENTION

In the field of digital radiography a wide variety of image acquisition techniques have been developed rendering a digital representation of a radiographic image.

Among such techniques are computerised tomography, nuclear magnetic resonance, ultrasound detection, detection of a radiation image by means of a CCD sensor or a video camera, radiographic film scanning etc.

In still another technique a radiation image, for example an X-ray image of an object, is stored in a screen comprising a photostimulable phosphor such as one of the phosphors described in European patent publication 503 702, published on 16 Sep. 1992 and U.S. Ser. No. 07/842,603 now U.S. Pat. No. 5,340,661. The technique for reading out the stored radiation image consists of scanning the screen with stimulating radiation, such as laser light of the appropriate wavelength, detecting the light emitted upon stimulation and converting the emitted light into an electric representation for example by means of a photomultiplier and finally digitizing the signal.

One of the benefits of a digital radiographic system resides in the possibility of processing the digital image representation before display or hard copy recording. The term "processing" in this context means any kind of image-processing such as noise filtering, contrast enhancement, data compression etc.

In some digital imaging systems the same original has to be processed in different ways to produce multiple hard-copies or displays originating from the same image. These different versions of one image may be helpful for a radiologist in making a specific diagnosis.

For example different versions of one original image may be generated that are processed taking into account different contrast enhancing modifying curves or different window level settings etc. Time-consuming, mostly convolution or non-linear neighbourhood operations, such as unsharp masking for edge enhancement, have to be repeated if e.g. several images processed according to different kernel sizes have to be produced.

A digital radiographic image is commonly represented by about 10 MB digital data. The computation time required for processing such an amount of data may extend to orders of minutes per processing cycle.

Hence, in case multiple differently processed versions of one image are required, it is highly desirable to optimize the processing procedure as far as the computation time is concerned.

Recently a new image processing technique has been developed. According to this technique an image (more specifically a digital signal representation of an image) is first decomposed into a multiresolution representation which represents localised image detail at multiple scales. For example, the image is decomposed into a sequence of detail images at multiple resolution levels and a residual image at a resolution lower than the minimum of said multiple resolution levels. Next, the pixel values of said multiresolution representation are modified by means of modifying function. And finally a processed image is computed by applying a reconstruction algorithm to the modified multiple resolution representation, the reconstruction algorithm being such that if it were applied to the unmodified multiresolution representation then said original image or a close approximation thereof would be obtained.

In a preferred embodiment the decomposition is pyramidal, meaning that the number of pixels in the components at successive resolution levels decreases.

OBJECTS OF THE INVENTION

It is an object of the present invention to provide a method of obtaining differently processed image versions originating from a single radiographic original image in a fast and computationally inexpensive way.

It is a further object to provide such a method in a system wherein a radiographic image is stored in a photostimulable phosphor screen and wherein a digital representation of said image is obtained by reading out said phosphor screen.

Still further objects will become apparent from the description given hereinbelow.

STATEMENT OF THE INVENTION

To achieve the above objects the present invention provides a method of processing a digital representation of an original radiographic image, comprising steps of:

1)-transforming said image into a multiresolution representation which represents localised image detail at multiple scales, 2)-storing said multiresolution representation into a memory, 3)-producing at least two differently processed images by applying at least two individual processing cycles, each processing cycle comprising the steps of:

4)-retrieving said multiresolution representation from said memory,

5)-modifying the multiresolution representation at at least one resolution level according to a non-identity function of a neighbourhood of retrieved values, said neighbourhood consisting of values of the same resolution level which correspond to a spatially coherent region of pixels in said image, 6)-obtaining said processed image by applying the inverse of said transform to the modified multiresolution representation.

The term memory is meant to include both a working memory and medium—or long term mass storage device whereby in case of working memory the processing is on-line processing immediately following image acquisition and in case of medium or long time mass storage the invention relates to future processing.

In the statement of the invention and the description hereinbelow interactions performed on an image or on a so-called detail image are to be interpreted as meaning interactions performed on the digital signal representation thereof.

It is preferred that the decomposition of the original image into a multiresolution representation is pyramidal so that the number of pixels in detail images at coarser successive resolution levels decreases thereby decreasing the number of pixels to be processed at successive resolution levels in the pyramid.

The decomposition of an image into such a multiresolution pyramidal representation has been described extensively in our copending European application 91202079.9 filed on 14 August 1991.

In one embodiment the multiresolution representation is a sequence of detail images at multiple resolution levels and a residual image at a resolution lower than the minimum of said multiple resolution levels.

Preferably the detail image at the finest resolution level is obtained as the pixelwise difference between the original image and an image obtained by low pass filtering the original image, wherein successive coarser resolution level detail images are obtained by taking the pixelwise difference between two low pass filtered versions of the original image, the second filter having a smaller bandwidth than the former.

In general the decomposition is to be performed so that each pixel value in said original image is equal to the sum of the corresponding pixel value of said residual image incremented by the corresponding pixel value of each of said detail images, said residual and detail images being brought into register with the original image by proper interpolation if their number of pixels is not equal to the number of pixels of the original image, and so that i) the mean of all pixel values in every detail image is zero; ii) the spatial frequency of every detail image is limited to a specific frequency band, said frequency band being defined as the compact region in the spatial frequency domain which contains nearly all (say 90%) of the spectral energy of the basic frequency period of said discrete detail image, adjusted to the original spatial frequency scale if said detail image contains less pixels than said original image; iii) every detail image corresponds to a different spatial frequency band, in such a way that the entire spatial frequency domain ranging from −pi to pi radians per pixel along both spatial frequency axes is covered by said spatial frequency bands associated with all said detail images considered within the decomposition; iv) each spatial frequency band associated with one of said detail images may partially overlap the neighbouring bands without being fully included by a frequency band associated with another detail image; v) the number of pixels within each detail image is at least the number of pixels required by the Nyquist sampling criterion, so as to avoid aliasing, vi) at least two of said spatial frequency bands are considered in the course of said decomposition.

Preferably the detail images at successively coarser resolution levels are obtained as the result of each of K iterations of the following steps:

a) computing an approximation image at a next coarser level by applying a low pass filter to the approximation image corresponding to the current iteration, and subsampling the result in proportion to the reduction in spatial frequency bandwidth, using however the original image as input to said low pass filter in the course of the first iteration;

b) computing a detail image as the pixelwise difference between the approximation image corresponding to the current iteration and the approximation image at a next coarser resolution level computed according the method sub 4.a), both images being brought into register by proper interpolation of the latter image; and wherein the residual image is equal to the approximation image produced by the last iteration, and wherein said reconstructed image is computed by iterating K times the following procedure starting from the coarsest detail image and the residual image: computing the approximation image at the current resolution level by pixelwise adding the detail image at the same resolution level to the approximation image at the coarser resolution level corresponding to the previous iteration, both images being brought into register by proper interpolation of the latter image, using however the residual, image instead of said coarser approximation image in the course of the first iteration.

The subsampling factor is preferably 2 and said low pass filter has an impulse response which approximates a two-dimensional gaussian distribution.

An apparently increased amount of pyramid values relative to the original image array is no problem since values of finer pyramid levels can be represented by fewer bits than values of coarser levels without affecting image quality.

An alternative decomposition procedure comprises decomposing said original image into a weighted sum of predetermined basic detail images at multiple resolution levels and a residual basic image by applying a transform to said image, said transform yielding a set of detail coefficients each expressing the relative contribution to the original image of one of a set of basis functions representing said basic detail images and a residual coefficient representing the relative contribution to the original image of a basis function representing said basic residual image, whereby said basis functions are continuous and non-periodic and have zero mean value except for the basis function that represents the basic residual image, and wherein said transform is characterised in that there exists an inverse transform which returns the original image or a close approximation thereof when being applied to said transform coefficients.

Preferably these basis functions are orthogonal. Still more preferable the functions are discrete wavelets.

The invention is advantageous in that most image enhancement tasks can be done using a multiresolution representation of an image which, according to this invention, is stored and retrieved to be used for each processing task.

Different processing cycles can be performed on a digital representation of a single original image in a fast and convenient way since the computationally most expensive step namely the multiresolution decomposition of an image is only performed once and is retrieved for application of any kind of processing.

Even the final resolution level can be selected in accordance with the destination of the processed image: iconic image, preview image, diagnostic image on screen or on film.

The processing referred to comprises any kind of image processing such as modification of detail contrast by modification of the values of detail images according to at least one non-linear monotonically increasing odd conversion function with a slope that gradually decreases with increasing argument values as has been described in our European application 91202079.9 filed 1992 Jul. 30 and U.S. Ser. No. 07/924,905.

noise reduction by attenuating pyramid values taking into account the locally estimated image content, a method described extensively in our copending European application 92201802.3 filed 1992 Jun. 19;

edge enhancement by increasing values of the finer resolution levels in the pyramid relative to the intermediate resolution levels, suppressing gradually evolving signal components across the image by decreasing the values of the coarser resolution levels relative to the intermediate levels, or any combination of these processing operations.

different amounts of processing can be obtained by varying processing parameters.

Finally in all these cases a processed image is reconstructed by applying the inverse of the decomposition transformation. This inverse transformation is also described extensively in the already mentioned European application 91202079.9 filed 1991 Aug. 14 and U.S. Ser. No. 07/924,905.

The inverse transformation is such that when applied to all unmodified detail images and the residual image into which the original image has been decomposd, the original image or a close approximation thereof would result.

Figure 2:
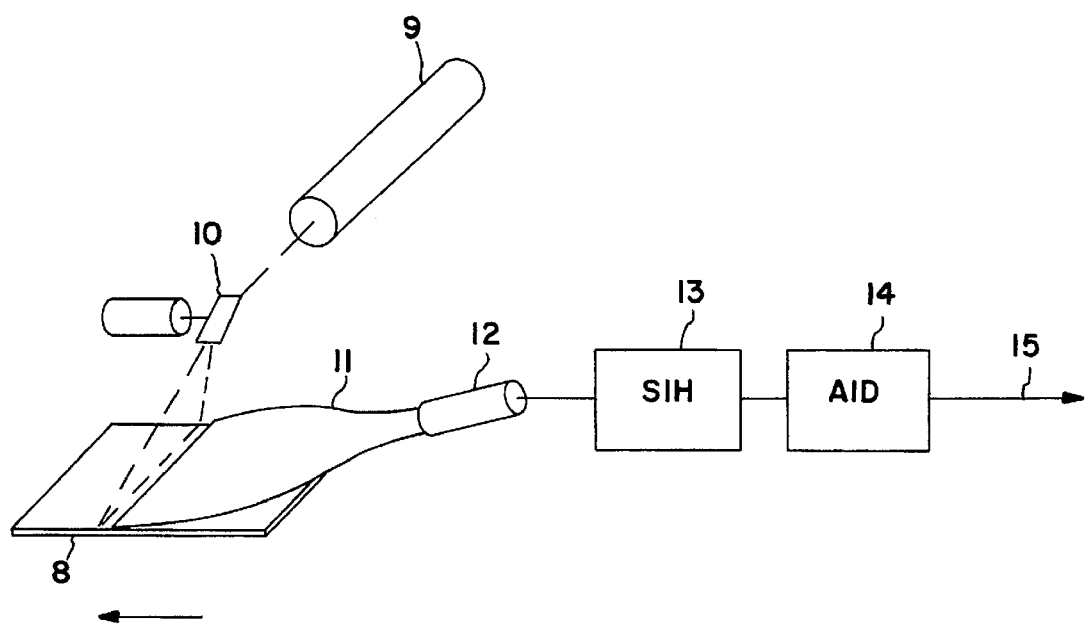
Figure 3A:
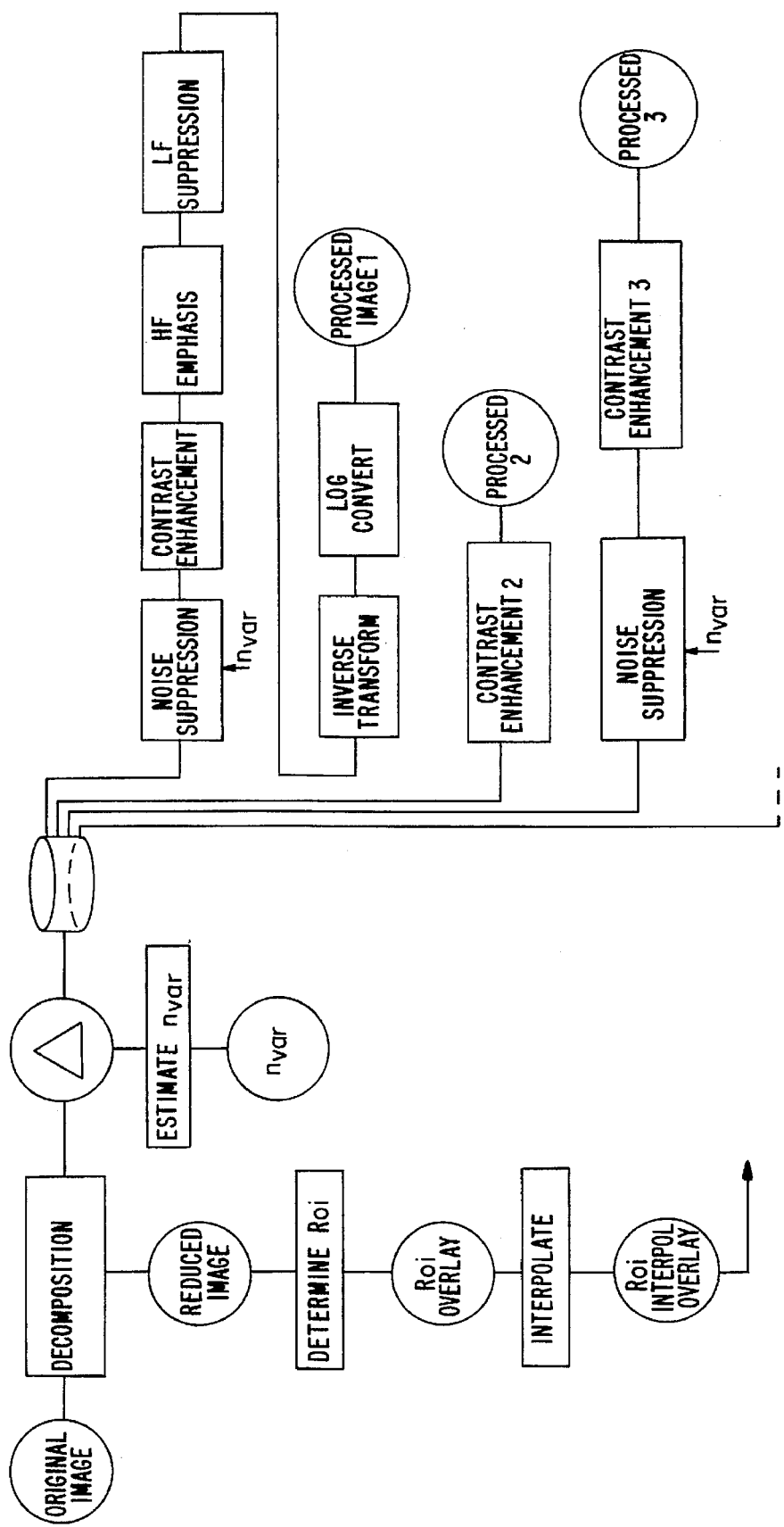
Figure 3B:
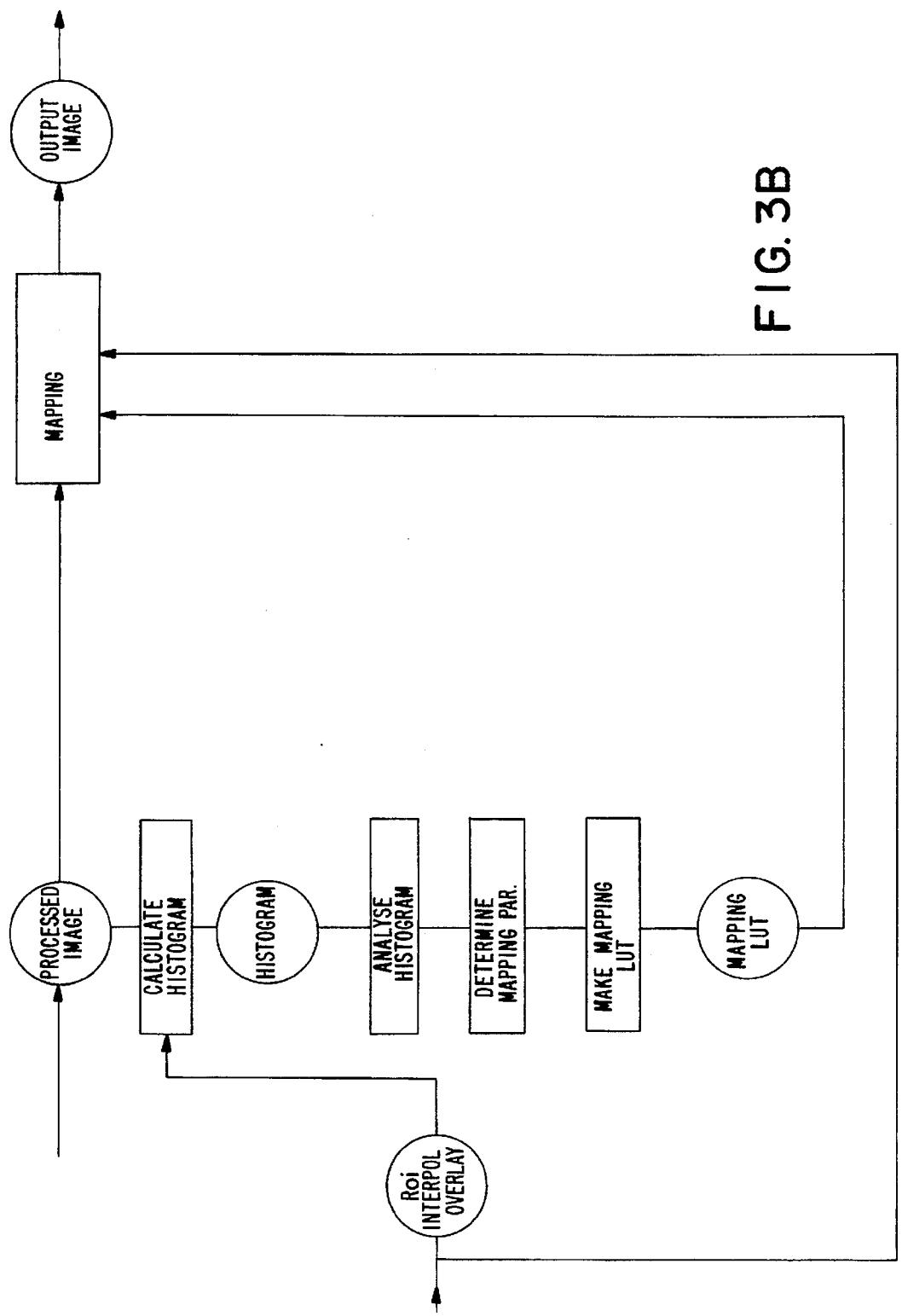
Figure 4:
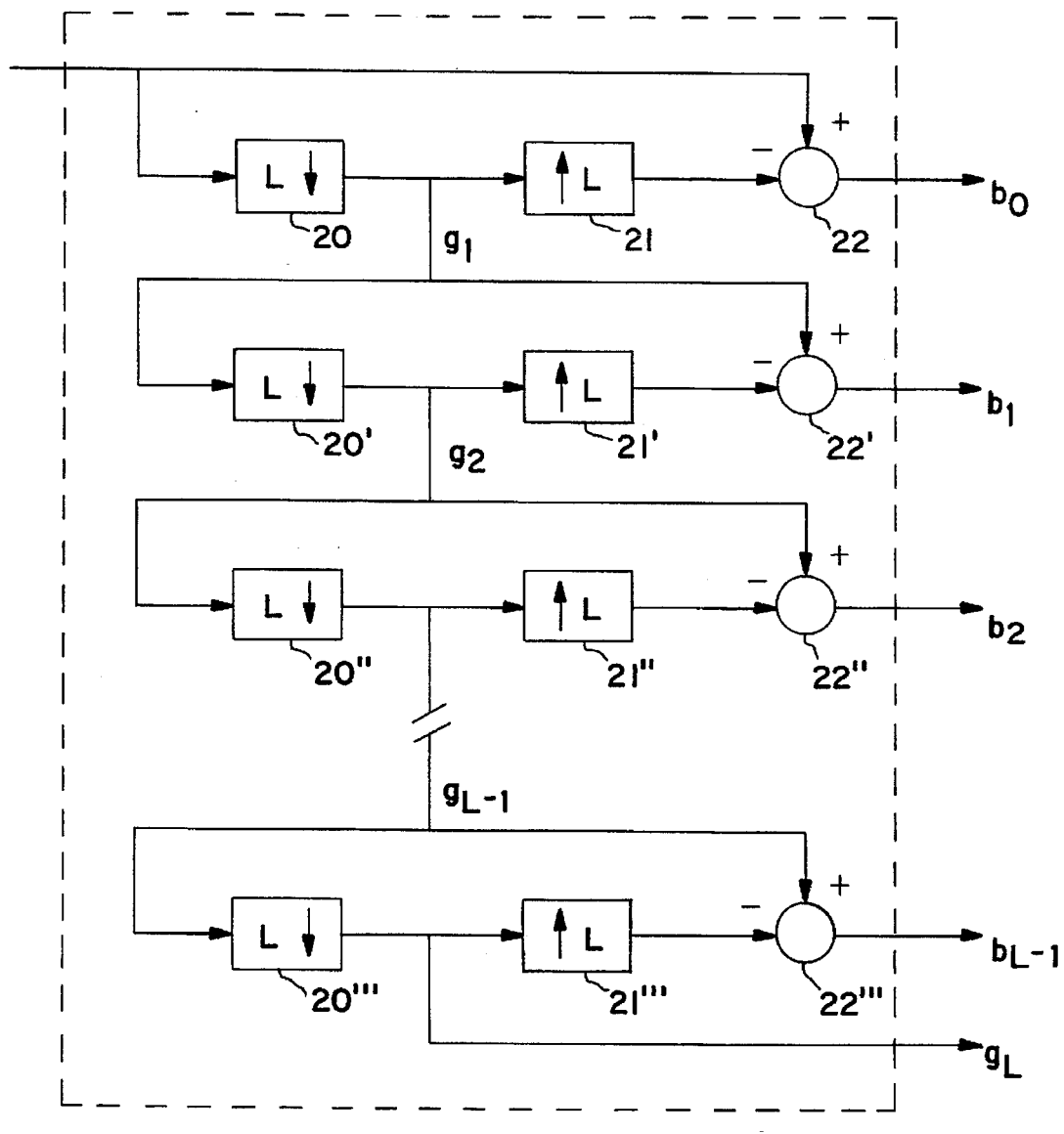
Figure 6:
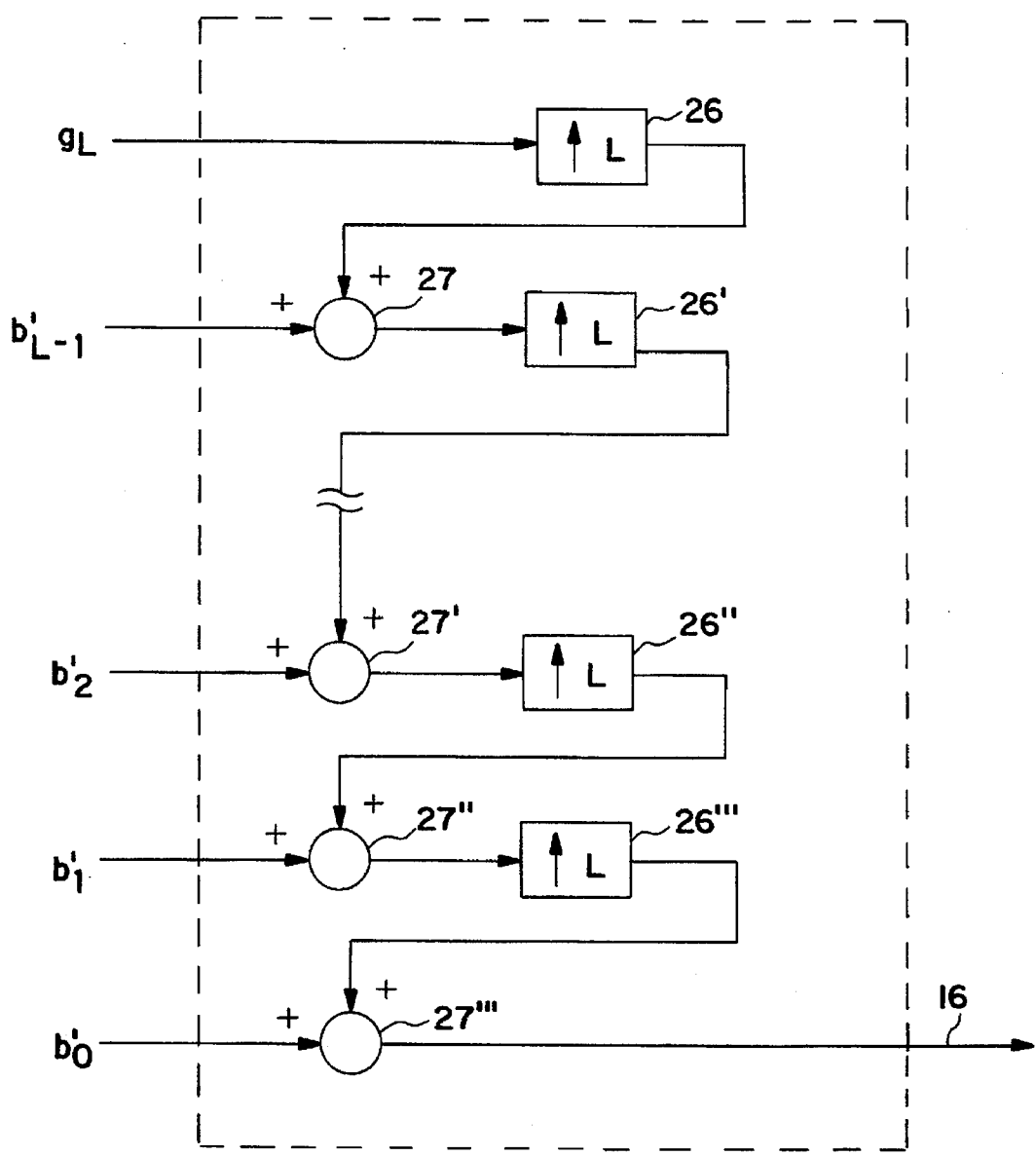
Figure 7:
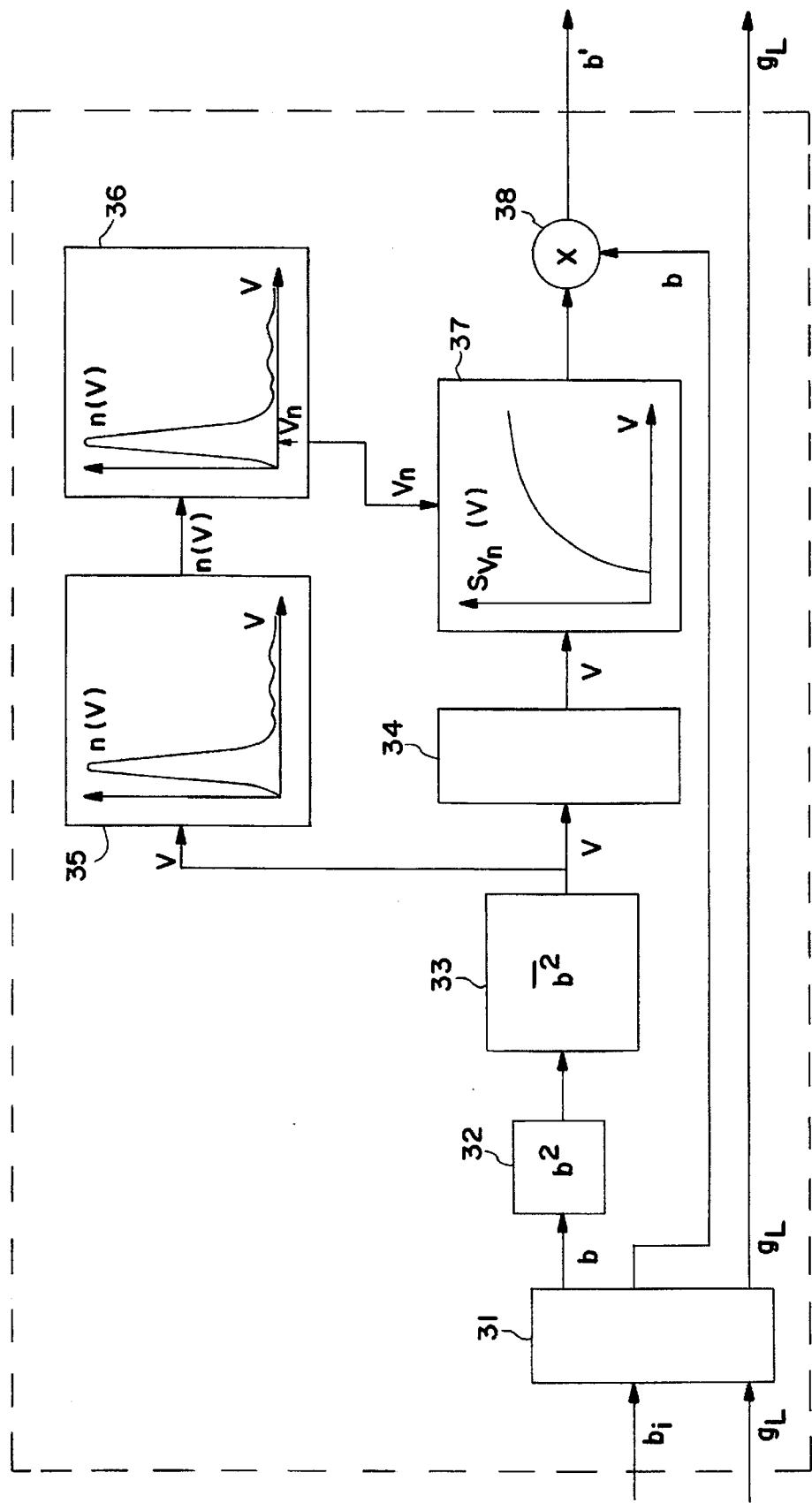
Figure 8:
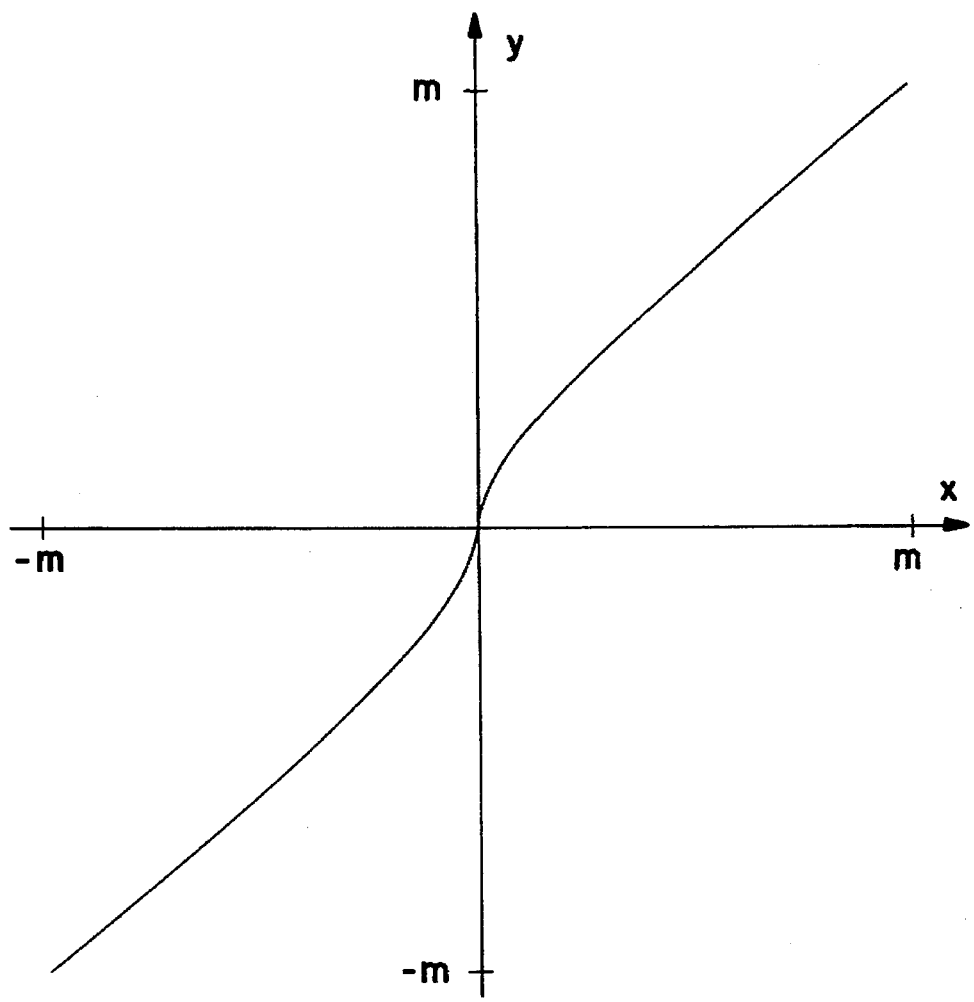
Figure 9:
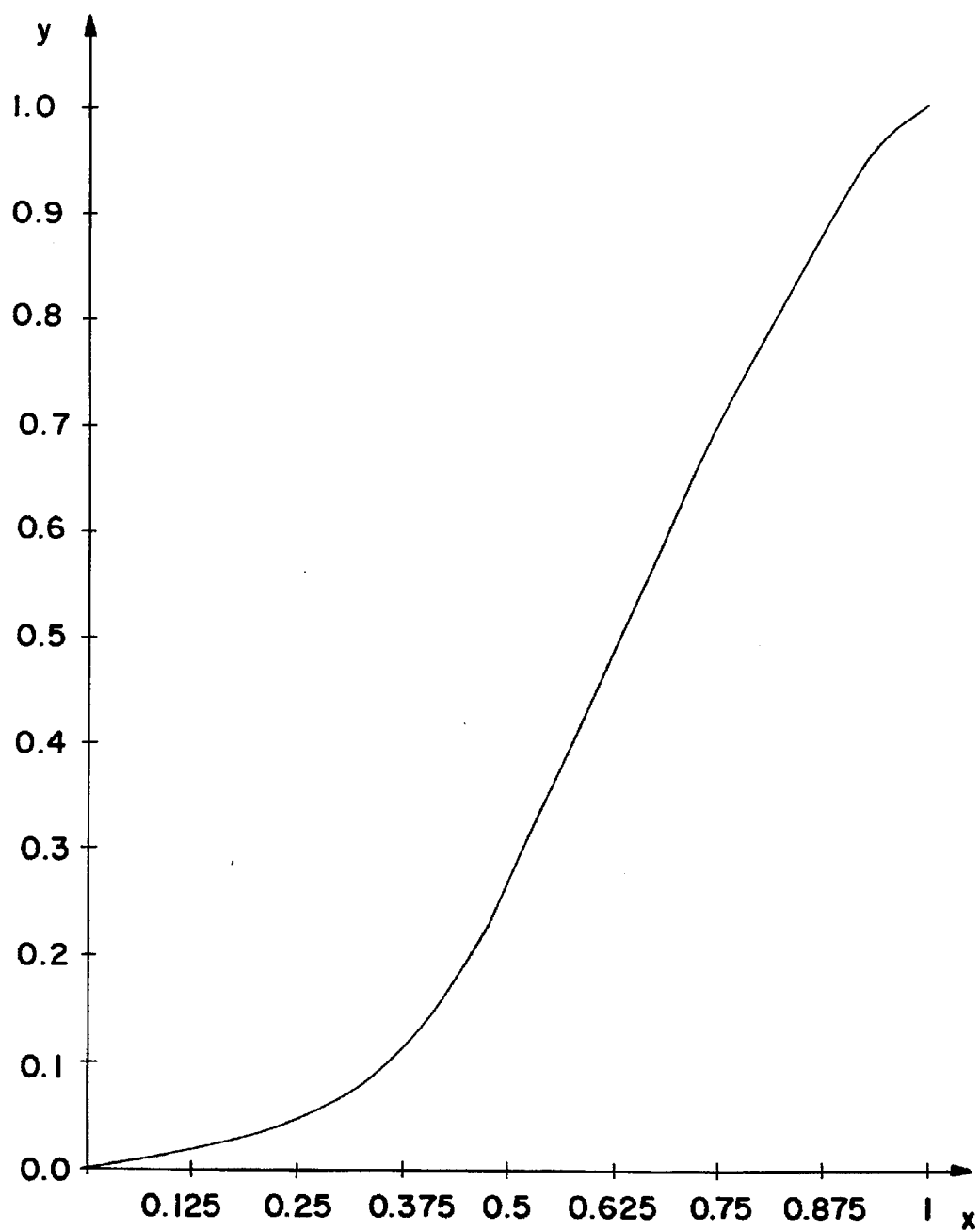

Particular aspects of the present invention as well as preferred embodiments thereof will be illustrated by means of the following drawings in which FIG. 1 is a general view of a system in which the method of the present invention can be applied, FIG. 2 is a detailed view of a system for reading an image stored in a photostimulable phosphor screen, FIG. 3a and 3b schematically illustrates the data processing performed on the read-out image signal, FIG. 4 illustrates a specific decomposition system, FIG. 5 is an example of a filter used in the decomposition procedure, FIG. 6 illustrates a specific reconstruction process, FIG. 7 illustrates a noise suppression process, FIG. 8 is a plot of a modifying function used for the purpose of contrast enhancement, FIG. 9 is a plot of a mapping curve.

FIG. 1 shows a system in which the present invention can be applied. A radiation image of an object was recorded on a photostimulable phosphor screen by exposing (2) said screen to x-rays transmitted through an object (not shown). The stimulable phosphor screen was conveyed in a cassette (3) provided with an electrically erasable programmable read-only memory (EEPROM). In an identification station (4) various kinds of data (name, date of birth etc) and data relating to the exposure and/or to the signal processing were recorded onto the EEPROM. In a radiation read-out apparatus (1) the latent image stored on the photostimulable phosphor screen was read-out. Then the image signal was sent to the image processor (7). After processing the image signal was sent to an output device (6) more specifically a laser recorder.

FIG. 2 shows one embodiment of an image read-out unit. This figure shows a photostimulable phosphor screen (8) that has been exposed to an X-ray image of an object. In the radiation image readout apparatus the latent image stored in the photostimulable phosphor screen is read out by scanning the phosphor sheet with stimulating rays emitted by a laser (9). The stimulating rays are deflected according to the main scanning direction by means of a galvanometric deflection device (10). The secondary scanning motion is performed by transporting the phosphor sheet in the direction perpendicular to the scanning direction. A light collector (11) directs the light obtained by stimulated emission onto a photomultiplier (12) where it is converted into an electrical signal, which is next sampled by a sample and hold circuit (13), and converted into a 12 bit digital signal by means of an analog to digital converter (14). The signal is also applied to a square root amplifier so that the output image representing signal also called 'original or raw' image (15) is a 12 bit signal which is proportional to the square loot of applied exposure values and represents the pixel value in 2048×2496 pixels.

From the output of the read-out apparatus the original image is sent to an image processor (numeral 7 in FIG. 1).

The sequence of the different processing steps performed on the image signal is illustrated in FIGS. 3a and 3b.

The invention is based on a pyramidal decomposition of the image signal into detail images at multiple resolution levels and a residual image. The image components (i.e. detail images at multiple resolution levels and residual image) are stored so that they can be retrieved to be subjected to at least two different types of processing or to at least two processing cycles of the same type but applied to a different degree.

After processing the modified detail images and the residual image are recombined by application of a reconstruction algorithm to obtain a processed image representation that is finally converted into a visible image (display or hard copy).

The display or hard-copy can be composed of a combination of differently processed images originating from one original image or alternatively more than one hard copy or display each representing a differently processed version of one original image can be generated.

Each of the steps performed on the image signal is described in detail hereinbelow.

One embodiment of the decomposition process is depicted in FIG. 4. In the decomposition section the original image is filtered by means of a low pass filter 20, and subsampled by a factor of two, which is implemented by computing the resulting low resolution approximation image $g1$ only at every other pixel position of every alternate row. A detail image $b0$ at the finest level is obtained by interpolating the low resolution approximation $g1$ with doubling of the number of rows and columns, and pixelwise subtracting the interpolated image from the original image.

The interpolation is effectuated by the interpolator 21, which inserts a column of zero values every other column, and a row of zero values every other row respectively, and next convolves the extended image with a low pass filter. The subtraction is done by the adder 22.

The same process is repeated on the low resolution approximation $g1$ instead of the original image, yielding an approximation of still lower resolution $g2$ and a detail image $b1$.

A sequence of detail images $bi$, $i=0 \ldots L-1$ and a residual low resolution approximation $gL$ are obtained by iterating the above process L times.

The finest detail image $b0$ has the same size as the original image. The next coarser detail image $b1$ has only half as many rows and columns as the first detail image $b0$. At each step of the iteration the maximal spatial frequency of the resulting detail image is only half that of the previous finer detail image, and also the number of columns and rows is halved, in accordance with the Nyquist criterion. After the last iteration a residual image $gL$ is left which can be considered to be a very low resolution approximation of the original image. In the extreme case it consists of only 1 pixel which represents the average value of the original image The filter coefficients of the low pass filter of the preferred embodiment are presented in FIG. 5. They correspond approximately to the samples of a two dimensional gaussian distribution on a 5×5 grid. The same filter coefficients are used for the low pass filters 20, 20',20", 20'". at all scales. The same filter kernel with all coefficients multiplied by 4 is also used within the interpolators 21, 21',21", 21'". The factor of 4 compensates for the insertion of zero pixel columns and rows.

Next, the decomposed images are stored on a storage disc indicated by numeral 5 in FIG. 1. At any time the decomposed image can be retrieved for any kind of processing and processing to different degrees (i.e. the same processing types however with different processing parameters), for example for performing the processing cycles shown in FIG. 3a and described later.

Then, each processing cycle applied to a decomposed image signal is terminated with reconstruction of a processed image by application of a reconstruction algorithm to the modified detail images and the residual image.

The reconstruction algorithm is identical for each of the processing cycles and is illustrated in FIG. 6.

The residual image $g_L$ is first interpolated by interpolator 26 to twice its original size and the interpolated image is next pixelwise added to the detail image of the coarsest level $b'_{L-1}$, using adder 27.

The resulting image is interpolated and added to the next finer detail image. When this process is iterated L times using the unmodified detail images $b_{L-1} \ldots b_0$ then the original image 15 will result. When at the other hand the detail images are modified before reconstruction according to the findings of the present invention, then a contrast enhanced image 16 will result. The interpolators 27, 27', 27", 27'" are identical to those used in the decomposition section.

After reconstruction the image is subjected to a logarithmic conversion.

In a great deal of the radiologic examination types the patient is protected against unnecessary exposure to x-rays by means of an x-ray opaque (collimation) material that is placed in the x-ray beam path for shielding the diagnostically irrelevant parts of the patient. However, the image data originating from the image part corresponding with the collimation material have an influence on the processing. Furthermore, when reproduced unmodified, the part of the image corresponding with the collimation material may cause problems in the display, for example it may impair diagnosis of subtle lesions due to dazzle since the unexposed image parts appear very bright. So, it is advantageous to exclude the data regarding the collimation material from further consideration during processing.

Hence a method has been developed for determining the signal/shadow boundary in an image so as to recognize the exact limits of the irradiation field, this method has been described in extenso in our copending European application entitled "Method of recognising an irradiation field" and filed on the even day. According to this method many hypotheses (being a segmentation of an image into signal and shadow regions) as to the location of the signal/shadow boundary are built from combinations of intermediate level primitives. These intermediate level primitives are for example extended line segments. Each proposed hypothesis is subjected to a number of tests so as to detect and reject an incorrect hypothesis; non-rejected hypotheses are then ranked in order that a single candidate may be chosen.

For the purpose of reducing the computational effort, the exact location of the irradiation field is calculated by applying the above method to one the low resolution images resulting from the decomposition processing described hereinbefore, namely on a low resolution image comprising 256×312 pixels (8 bit representation), this image is used as an operational tool for determining the irradiation field, furtheron called "the region of interest", this low resolution image serves as a 'reduced image version' and is stored on the system disc.

The method described higher for delineating the image region of diagnostic interest results in an overlay image with the same number of elements as the low resolution image. The resulting overlay image is interpolated so as to represent 2048×2496 pixels, a number equal to the number of pixels in the original image. The non-interpolated overlay image is stored for later use when determining the histogram of the region of interest in the processed image, as will be described furtheron.

For hard copy recording or display the processed image is subjected to a signal-to-density conversion on the basis of a mapping curve defining the relation between the individual signal values and the correspondingly envionsioned density value.

Parameters for defining the mapping curve are deduced from analysis of the histogram of the region of interest in the processed image. This region of interest is determined by selecting out of the pixels of the processed image only these pixels that belong to the image area defined by the overlay image produced by a method described higher, the pixels of the region of interest in the processed image are then applied to a histogram calculation circuit.

In a following processing step this histogram is analysed so as to determine the limits of the signal range relevant for display or reproduction.

The analysis of the histogram is performed as described in our European application EP 91203212.5 filed on 9 Dec. 1991 and U.S. Ser. No. 07/978,786. The analysis of the histogram results in the definition of a signal range to be extracted for further processing, this range is obtained by performing the steps of determining the maximum histogram frequency, selecting a value t smaller than the maximum histogram frequency, determining (a) histogram peak(s) as a range of successive signal values having a corresponding histogram frequency that is larger than t, determining the most relevant histogram peak as the histogram peak for which the summation of all histogram frequencies corresponding with signal values within said peak is maximum, determining minimum and maximum signal values within said most relevant histogram peak, and determining extreme values of the signal range to be extracted as said minimum value decreased with a small offset $d_0$ and said maximum value increased by a small offset value $d_1$. For example $d_0$ was equal to 0.2 log exposure units, $d_1$ was equal to 0.1 log exposure units.

Next, the extracted signal range is used in the process of defining the mapping curve as described in our European application EP 91203209.1 filed 9 December 1991 and U.S. Ser. No. 07/978,091. The mapping curve was determined as follows: First the minimum density value $D_{smin}$ and the maximum density value $D_{smax}$ envisioned in the hard copy were defined, $D_{smin}$ was equal to fog density and $D_{smax}$ was equal to 3.0. These parameters were obtained from a parameter table and are a function of the examination type. Then a canonical function defined in an orthogonal coordinate system between $x_o$, $x_1$ and $y_{min}$, $y_{max}$ was retrieved from the internal memory of the signal processor. This function is also function of the examination type. Next two values $S_{min}$ and $S_{max}$ were determined that constitute a range wherein the conversion of signal values onto density values is determined by the specific shape of the canonical function. Signal values smaller than $S_{min}$ are mapped onto $D_{smin}$, signal values greater than $S_{max}$ are mapped onto $D_{smax}$. In this embodiment the latitude of said range was a fixed value L=1.5 log exposure (corresponding with the latitude of a conventional x-ray film the radiologist is used to work with) and the position of $S_{min}$ was determined relative to the diagnostically relevant signal range. $S_{max}$ was then calculated as $S_{min}$+L. For determining the position of $S_{min}$ relative to the relevant signal range, the extreme values $S_0$ and $S_1$ of the diagnostically relevant signal range were first determined by evaluation of the image histogram. Then a small offset $dS_1$=0.3 log E was added to $S_1$. This ensures that the density in the hard copy corresponding with the maximum value of the diagnostically relevant signal range does not become too dark. The positioning of the range $S_{max}$-$S_{min}$ relative to the range $S_1$-$S_0$ was performed by aligning a fraction of the latter range with the same fraction of the former range. Mathematically this fraction can be expressed as $A(S_1+dS_1-S_0-dS_0)$. Then the alignment can be formulated mathematically as $S_{min}=S_0+dS_0+A(S_1+dS_1-S_0-dS_0)$ —A.L and $S_{max}=S_{min}$+L, A being an integer value greater than or equal to 0 and smaller than or equal to 1. Next a look up table representing the mapping curve is composed and stored. FIG. 9 shows a canonical curve used for determining the mapping curve.

Finally the mapping curve is applied to the region of interest of the processed image defined by application of the extrapolated overlay image so as to obtain the output image.

Reference is again made to FIG. 3a illustrating different types of processing as well as processing to different degrees that were applied to the retrieved detail images.

The figure shows a first processing cycle wherein successively noise suppression, contrast enhancement, high frequency enhancement and low frequency suppression are performed prior to reconstruction of a processed image.

Each of these processing sub-steps are described hereinbelow.

An embodiment of a noise suppressing section comprising a section wherein the noise variance is estimated, is illustrated in FIG. 7. This type of noise suppression processing has been described in our copending European application 92201802.3 filed 1992 Jun. 19.

Numeral 31 is a storage device wherein the detail images $b_i$ and the residual image $g_L$ resulting from the image decomposition are stored and corresponds with the storage disc shown in FIG. 3a. Each detail image is pixelwise transferred to a squaring unit 32, starting with the coarsest detail image. A moving average operator 33 then computes the local variance v at every pixel position by summing all squared pixels in an N×N neighbourhood centered around the current target pixel (a neighbourhood of 15×15 elements proved to be adequate), and dividing the sum by the number of pixels in the neighbourhood. These local variance pixels are temporarily stored in a storage device 34 and transferred at the same time to a histogram computation circuit 35. A histogram is an array, the elements of which are called bins, each bin corresponding to a fixed sampling interval of the signal range associated with the horizontal histogram axis. Each bin resides in a memory cell, all of them being initialised to zero before accepting the first pixel. For each entered variance value the histogram computation circuit selects the corresponding bin index and increments the associated bin value by one. After all pixels of a variance image at a particular resolution level have been used in this way, the histogram represents the occurence of every quantised variance value throughout the image. This local variance histogram is next supplied to a maximum locator 36 which determines the variance value with the highest occurence $v_n$ in the histogram. This value is used as an estimate for the noise variance within the considered detail image. This estimated value is one of the parameters that is stored. The noise variance vn determined by the maximum locator is used as a parameter in the noise suppression function Svn (v), which is defined as:

Svn $(v)$=0 if $v<=K * vn$

Svn $(v)$=1-$K * vn/v$ otherwise where K is a fixed noise suppression factor which determines the amount of noise suppression to be applied; K=0 implies no noise suppression. This function is computed and installed as a noise suppression look-up table 37 for every detail image within the decomposition. When a noise suppression look up table corresponding to a particular resolution level has been installed, all variance pixels corresponding with the same level are fetched from the storage device and tranformed into a sequence of attenuation coefficients. The resulting pixels are computed by pixelwise multiplying 38 these coefficients with the pixels of the detail image at the same level, fetched from the storage device 31. This whole process is repeated for all detail images up to the finest level, to yield attenuated detail images.

Next, the modified detail images are subjected to contrast enhancement as described extensively in our copending European applications 91202079.9 filed 1991 Aug. 14 and U.S. Ser. No. 07/924,905.

This step is performed by modifying the pixels of the detail images (after noise suppression) to yield pixel values of a set of modified detail images according to at least one non-linear monotonically increasing odd modifying function with a slope that gradually decreases with increasing argument values.

In the modification section a lookup table is provided which converts every pixel value x of each detail image into an output value y according to the function:

$y=-m * (-x/m)^p$ if $x<0$ $y=m * (x/m)^p$ if $x>=0$ where the power p is chosen within the interval 0<p<1, preferably within the interval 0.5<p<0.9. A comparative evaluation of a large number of computed radiography images of thorax and bones by a team of radiologists indicated that p=0.7 is the optimal value in most cases. m specifies the abscissa range: $-m<=x<=m$, e.g. m=4095 if detail pixels are represented by 13 bits signed. A plot of the above function is presented in FIG. 8.

If depending on the used decomposition method either the pixels of each detail image or otherwise the detail weighting coefficients as obtained from one of the above decomposition methods, are converted according to the above function, then all details with a low amplitude will be boosted relative to the image details wich originally have a good contrast. In this respect the above power function proved to perform very well, but it is clear that an infinite variety of monotonically increasing odd mapping functions can be found that will enhance subtle details. The main requirement is that the slope of said mapping function is steeper in the region of argument values that correspond to small detail image pixel values or coefficient values than it is in the region of large detail pixel or coefficient values. In an alternative embodiment excessive noise amplification can be avoided by using a composite mapping function:

$$y = -m * (-x/m)^{p2} \text{ if } -m <= x <= -c$$

$$y = -m * (c/m)^{p2} * (-x/c)^{p1} \text{ if } -c <= x < 0$$

$$y = m * (c/m)^{p2} * (x/c)^{p1} \text{ if } 0 <= x < c$$

$$y = m * (x/m)^{p2} \text{ if } c <= x <= m$$

where the power p2 is chosen within the interval 0<p2<1, preferably 0.5<p2<0.9, and most preferably p2=0.7 (however the preferred value of p2 depends upon the kind of radiological examination), where the power p1 is not smaller than p2: p1>=p2, where the cross-over abscissa c specifies the transition point between both power functions: 0<c<m, and preferably c is very small relative to m; and where m specifies the abscissa range: −m<=x<=m.

Then after the contrast enhancement step the modified detail images were subjected to a high frequency emphasising step. Edge enhancement is obtained by increasing values of the finer resolution levels in the pyramid relative to the intermediate resolution levels.

The following processing step comprises suppressing gradually evolving signal components across the image by decreasing the values of the coarser resolution levels relative to the intermediate levels.

Finally the processed detail images and the residual image were subjected to a reconstruction algorithm as described higher and to the reconstructed processed image a logarithmic conversion was applied.

Then the reconstructed image was converted into a visible image. Apart from the above described processing cycle, FIG. 3a shows alternative processing cycles that can be performed on the same detail images into which the original image has been decomposed and that are stored.

In this example the other cycles are either alternative combinations of the above described processing steps for example only comprising contrast enhancement and no noise suppression nor high frequency emphasis nor low frequency suppression.

Still other cycles illustrate identical combinations of processing steps, however being applied to a different degree. For example it is possible to amend parameters of the noise suppression function Svn (v), which is defined as:

$$\text{Svn } (v) = 0 \text{ if } v <= K * vn$$

$$\text{Svn } (v) = 1 - K * vn/v \text{ otherwise}$$

where K is a fixed noise suppression factor which determines the amount of noise suppression to be applied.

Or, alternatively to amend parameters in the modifying function applied for contrast enhancement which is given by $$y = -m * (-x/m)^p \text{ if } x < 0$$

$$y = m * (x/m)^p \text{ if } x >= 0$$

where the power p is chosen within the interval 0<p<1, .

It will be clear that many alternatives may be envisioned that fall within the scope of the present invention. The invention is not limited to the described processing steps, combinations or processing degrees.

I claim:

1. A method of generating more than one differently processed image version originating from a single radiation image, comprising the steps of:

1. applying a decomposition transform to said radiation image to decompose it into a multiresolution representation which represents localized image detail at multiple resolution levels,
   2. storing said multiresolution representation into a memory,
   3. producing at least two differently processed image versions by applying at least two individual processing cycles to said multi-resolution representation, each processing cycle comprising the steps of:
      (i) retrieving said multiresolution representation from said memory,
      (ii) modifying the multiresolution representation at at least one resolution level by applying a non-linear monotonically increasing odd modifying function with a slope that gradually decreases with increasing argument values to elements of the multiresolution representation that belong to a same resolution level,
      (iii) obtaining a processed image representation by applying the inverse of said decomposition transform to the modified multiresolution representation,
      (iv) applying said processed image presentation to a hard copy recorder or to a display device to control generation of density values of a processed image version of said original image.

2. Method according to claim 1 wherein said slope decreases gradually with increasing argument values except for a region of lowest absolute argument values where the slope is constant or increasing.

3. A method according to claim 1 wherein said multiresolution representation is obtained as a sequence of detail images at multiple resolution levels and a residual image at a resolution level lower than the minimum of said multiple resolution levels and wherein the number of pixels in the detail images decreases at each coarser resolution level.

4. A method according to claim 3 wherein the detail image at the finest resolution level is obtained as the pixel wise difference between the original image and an image obtained by low pass filtering the original image, and wherein the successive coarser resolution level detail images are obtained by taking the pixelwise difference between two low pass filtered versions of the original image, the second having a smaller bandwidth than the former.

5. A method according to claim 3 wherein the detail images at successive coarser resolution levels are obtained as a result of K iterations of the following steps:

a) computing an approximation image at a next coarser level by applying a low pass filter to the approximation image corresponding to the current iteration, ans subsampling the result in proportion to the reduction in spatial frequency bandwidth, using the original image as input to said low pass filter in the course of the first iteration;
   b) computing a detail image as the pixelwise difference between the approximation image corresponding to the current iteration and the approximation image at a next coarser resolution level computed according to the method sub 4a;both images being brought into register by proper interpolation of the latter image;

and wherein the residual image is equal to the approximation image produced by the last iteration,
   and wherein said processed image is computed by iterating K times the following procedure starting from the coarsest detail image and the residual image:
   computing the approximation image at the current resolution level by pixelwise adding the modified detail image at the same resolution level to the approximation image at the coarser resolution level corresponding to the previous iteration, both images being brought into register by proper interpolation of the latter image, using the residual image instead of the coarser approximation image in the course of the first iteration.

6. A method according to claim 5 wherein said subsampling factor is 2, and said low-pass filter has an impulse response which approximates a two-dimensional gaussian distribution.

7. A method according to claim 1 wherein said digital image representation is obtained by scanning a photostimulable phosphor screen that has been exposed to said radiation image with stimulating irradiation, detecting light emitted upon stimulation and converting said detected light into a digital representation.

8. A method according to claim 1 wherein said modifying function depends on the pixel value of a corresponding pixel in said original image.

9. A method according to claim 1 wherein said modifying function is not identical for each resolution level in said decomposition, such that modifications applied to finer resolution levels amplify image detail more than modifications applied to intermediate resolution levels.

10. A method according to claim 1 wherein different modifying functions are used for different resolution levels in said decomposition, such that modifications applied to coarser resolution levels amplify image detail less than modifications applied to intermediate resolution levels.

11. A method according to claim 1 wherein said multi-resolution representation is modified to an extent that depends on an estimation of the amount of variance in the image and in accordance with an estimated noise level.

12. A method according to claim 11 wherein said noise level is determined as the estimated noise level in each detail image.

13. A method according to claim 11 wherein a set of noise suppression functions are computed, each being associated with one of said detail images, said functions being monotonically non-decreasing in one variable and parametrically depending on said noise variance in a non-increasing monotonic way and said suppression functions being positive and asymptotically reaching a maximum value equal to one and wherein each detail image is attenuated by multiplying it with an associated noise suppression function evaluated at an abscissa equal to said local detail image variance.

14. The visual image produced by the process of claim 1.

15. The visual image produced by the process of claim 3.

16. The visual image produced by the process of claim 7.

* * * * *